United States Patent [19]

Lehr et al.

[11] Patent Number: 5,452,195
[45] Date of Patent: Sep. 19, 1995

[54] START-UP CIRCUIT FOR A SWITCH MODE POWER SUPPLY

[75] Inventors: Steffen Lehr; Volker Neiss; José I. Rodriguez-Duran, all of Villingen-Schwenningen, Germany; Rudolf Koblitz, Meylan, France

[73] Assignee: Deutsche Thomson-Brandt GmbH, Villingen-Schwenningen, Germany

[21] Appl. No.: 138,212

[22] Filed: Oct. 8, 1993

[30] Foreign Application Priority Data

Apr. 8, 1991 [DE] Germany .................. 41 11 277.6

[51] Int. Cl.⁶ .......................................... H02M 3/335
[52] U.S. Cl. .......................................... 363/21; 363/49; 323/901
[58] Field of Search ................... 363/20, 21, 49; 323/901; 315/411; 358/190

[56] References Cited

U.S. PATENT DOCUMENTS

| | | | |
|---|---|---|---|
| 4,277,824 | 7/1981 | Alberkrack | 363/49 |
| 4,864,485 | 9/1989 | Rilly | 363/49 |
| 5,072,353 | 12/1991 | Feldtkeller | 363/20 |

FOREIGN PATENT DOCUMENTS 265500 10/1987 German Dem. Rep. ... H02M 5/451
3538693 10/1985 Germany .................. H02M 3/156

OTHER PUBLICATIONS

Elektronik 3/2.2 1990, Bauelemente, pp. 44 to 48 Wilfried Blaesner "Schaltnezteile mit Stromregelung einfach realisiert".
Eleltronik 9/27.4 1990, Stromversorgung, pp. 134 to 140 Wilfried Blaesner "Erhohte Betriebssicherheit und niedrigere Kosten".

*Primary Examiner*—A. D. Pellinen
*Assistant Examiner*—Y. Jessica Han
*Attorney, Agent, or Firm*—Joseph S. Tripoli; Joseph J. Laks; Sammy S. Henig

[57] ABSTRACT

An integrated control circuit forms a driver stage of an output transistor of a switch mode power supply. During a start-up interval of a run mode operation, the control circuit does not consume supply current and does not produce a switching control signal for switching the transistor. During an initialization interval that follows the start-up interval, a reference voltage source that is included in the control circuit is turned on and internal conditions in the control circuit are defined. The switching control signal is generated following the initialization interval.

9 Claims, 4 Drawing Sheets

START-UP CIRCUIT FOR A SWITCH MODE POWER SUPPLY

This is a continuation of PCT application PCT/EP92/00760 filed Apr. 4, 1992 by Steffen Lehr, Voker Meiss, Rudolf Blitz, and Jose Ródriguez-Duran and titled "Start-up Circuit For A Switch Mode Power Supply"

This invention is directed to a start-up power supply for a television receiver or a video recorder. With a switch mode power supply there is the basic danger that when the power supply is switched on or off, components, such as the switching transistor which serves as a power switch, are endangered by undefined conditions. This is especially true if collector voltages and collector currents appear simultaneously at a power transistor operating as a switch, or if the switching transistor is not fully switched on when the full collector voltage is applied.

It is an object of the invention to guarantee, for such a switch mode power supply, a controlled switching-on and switching-off without endangering the components and, at the same time, to reduce the power consumption in the start-up mode. A further development of the invention is the provision of a switch mode power supply having a wide regulation range and low losses in a snubber network.

The invention consists, therefore, of four successive operational phases. In a first start-up phase an integrated circuit (IC) is so dimensioned that, during a defined time after being switched on the start-up voltage rises form zero to a threshold value, and the IC accepts no current. Accordingly, the total charging current flows through a charging resistor and charges a capacitor and the charging resistor does not need to supply any additional current for the IC or other components thus, the power dissipation is lower at the charging resistor and a less expensive resistor can be used.

In the second phase, which is an initialization phase, the IC is initialized above the threshold value in the sense that all parameters and components of the IC are brought to a defined state. In the initialization phase, a reference voltage source is switched on. Consequently, this phase produces, independently of the starting condition, clear defined states which are optimum and nondangerous starting points for all components for the subsequent normal operation.

After the initialization phase the IC is switched to a normal pulsed operation phase. This phase is advantageous in that the switch over to pulsed operation is based on defined conditions which exclude any danger to the components. In the initial region of the normal operation phase the supply voltage applied to the IC drops and is replaced, or supplemented, by an operating voltage from a separate voltage source. This is based on the fact that the current passing through the charging resistor alone is not sufficient to feed the IC in the normal operating mode. The current supplied by the charging resistor is small in comparison to the current supplied by the separate voltage source. The result is a reduction in the power consumption during the start-up phase and defined conditions for all components at the beginning of the pulsed operation phase and during the successive phases, no components are endangered.

The initialization phase includes, preferably, a first time period in which conditions are set, the current consumption of the IC is less than the charging current and, consequently, the supply voltage rises further. In a second time period all functions are activated by the switching-on of a reference voltage source in which the current consumption of the IC is greater than the charging current and, as a result, the supply voltage drops. The IC preferably contains an amplitude threshold value circuit with a breakdown diode which prevents current consumption of the IC below the threshold value.

A further development of the invention consists of in principle, three circuit and dimensioning features. According to a first dimensioning feature, regulating information obtained on the secondary side of a transformer is transferred in the form of a reverse charging current, to the primary side of the transformer during the idle phase of the transformer. This voltage regulates the operating frequency and the operating period of the switching transistor. The use of this method of transferring the regulating information from the secondary side to the primary side during the idle phase of the transformer eliminates the need for an additional component, such as, a separate transformer or an optoelectronic coupler for transferring the regulating information.

According to a second dimensioning feature, the operating frequency in the range of low-transmitted power is regulated proportional to the power transmitted. A maximum regulation range is achieved by the simultaneous regulation of the switch-on duration and the switch-off duration of the switching transistor because the switching transistor can be operated up to its maximum possible switch-on time of approximately 50% of the period of the operating frequency.

According to a third dimensioning feature, in the range of high transmitted power, the switching-on of the switching transistor occurs near the beginning of the idle phase of the transformer directly at the end of the regulating information being transferred from the secondary side to the primary side. At this point in time the collector voltage of the switching transistor is still low so that the power dissipation at the snubber network is kept low. A major power dissipation via this network would occur during the idle phase of the transformer after the end of the actual regulating information if the switch-on time of the switching transistor was not firmly defined in the second dimensioning. The situation could occur that the switching transistor switches on precisely when the collector voltage in the idle phase of the transformer is high. The idle phase is, therefore, used only in so far as it is necessary for the evaluation of the regulating information for the purpose of gaining the regulating voltage. Directly thereafter, the switching transistor is compulsory switched on. The switch-off duration of the switching transistor is then limited to a minimum necessary value in the sense of high operating frequency.

Therefore, in total, by combining the three dimensioning features controlled start-up upon switching on without endangering components, a wide regulation range, a low power dissipation of the snubber network and a simple circuit are achieved.

The invention is described with reference to the figures in which:

FIG. 2 shows the successive voltages during the phases of switching on,

Figure 2:
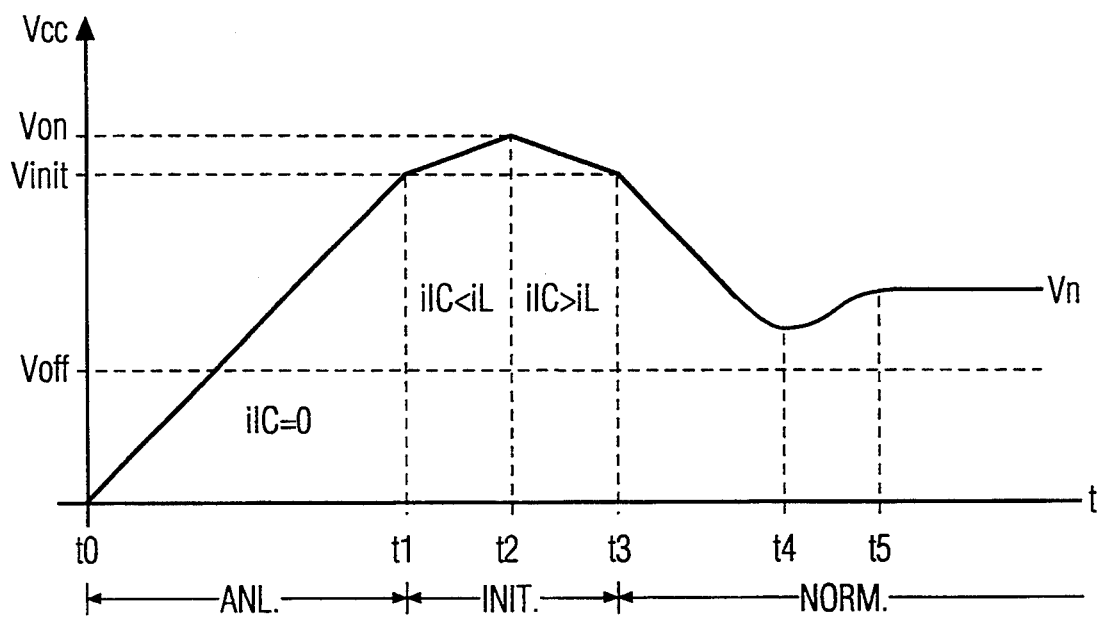
Figure 3:
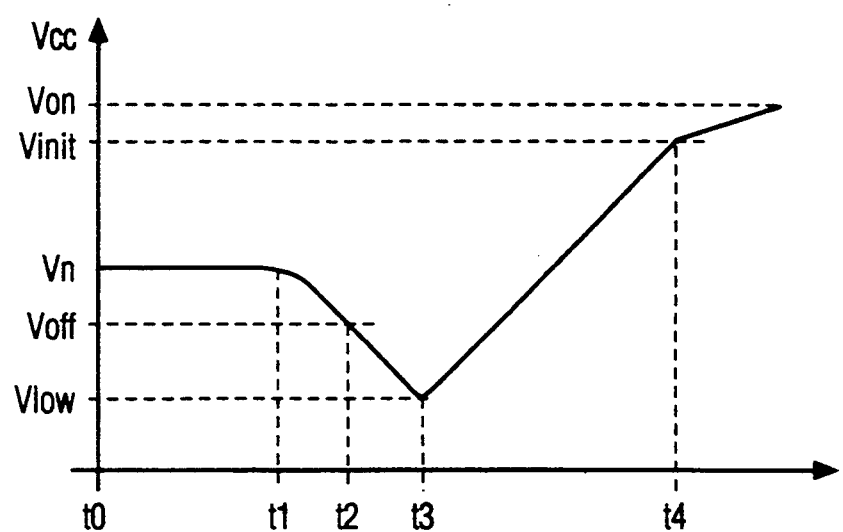
Figure 4:
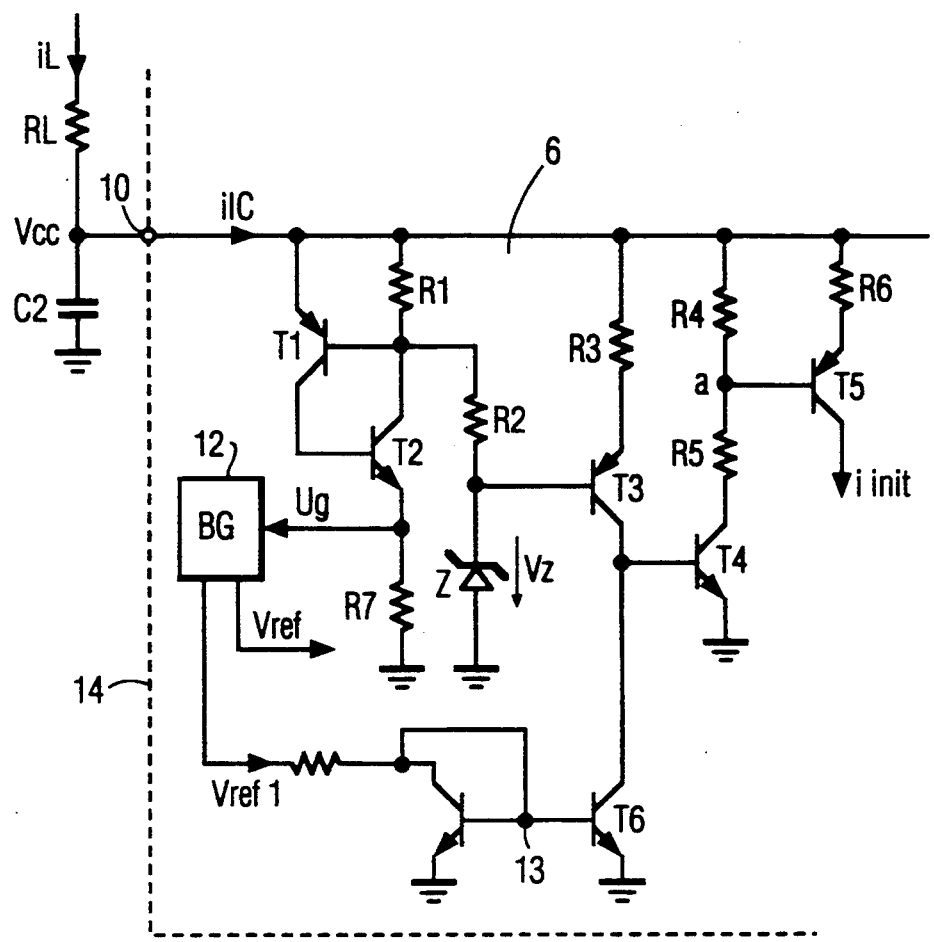
Figure 5:
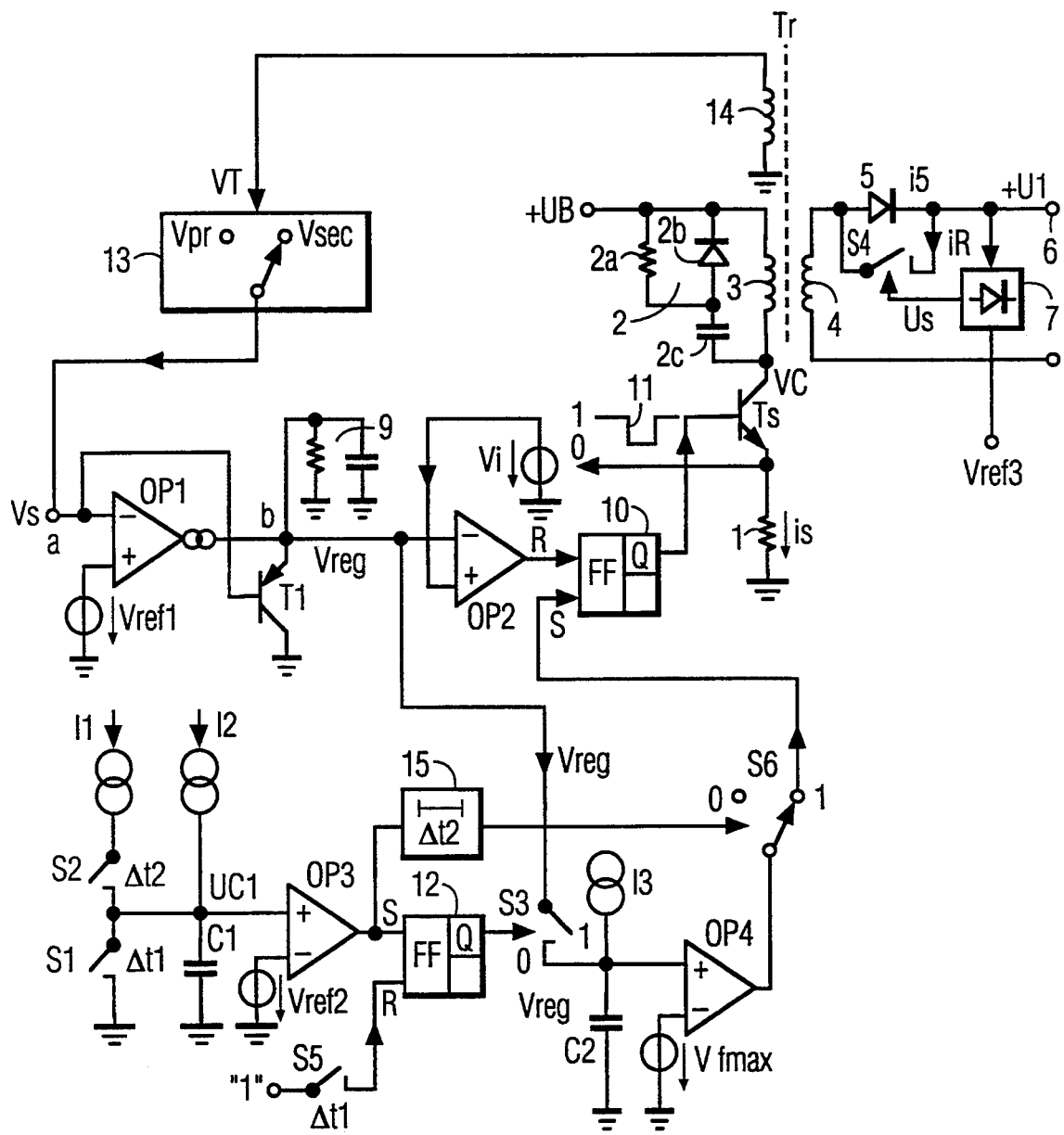
Figure 6:
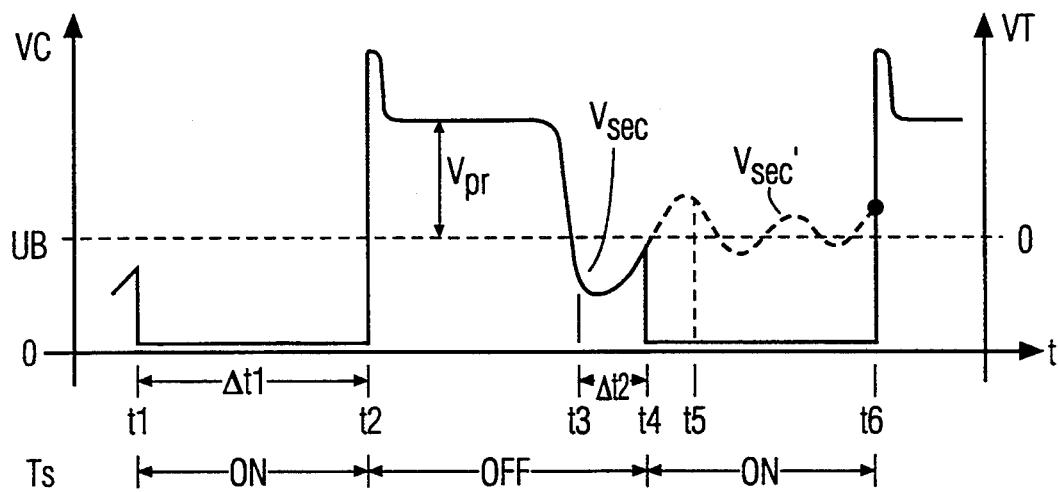
Figure 7:
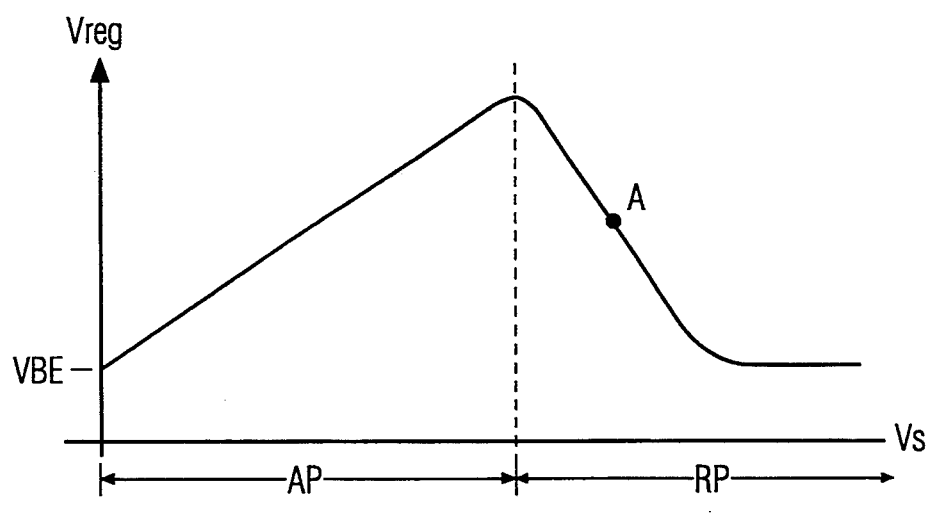

FIG. 3 shows the successive voltages during the phases of switching off in the case of a malfunction, FIG. 4 is a detailed circuit for achieving the individual phases according to FIG. 2, FIG. 5 is another preferred embodiment of a switch mode power supply, FIG. 6 shows curves for explaining the function of the embodiment of FIG. 5, FIG. 7 shows the progression of the regulating voltages upon switching on the embodiment of FIG. 5.

Figure 1:
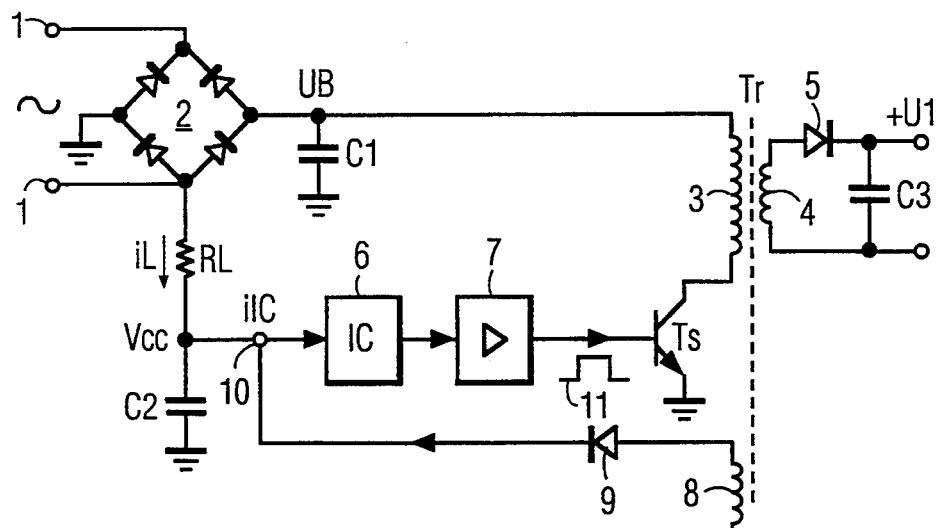
FIG. 1 is a preferred embodiment of a switch mode power supply.

In FIG. 1 the network terminals 1 are connected to the input terminals of a bridge rectifier 2 which provides an operating voltage UB for the switch mode power supply to a charging capacitor C1. The parts of the switch mode power supply illustrated are a switching transistor Ts, a primary winding 3 of a transformer Tr, a secondary winding 4 and a rectifier 5, which provides an operating voltage-U1 to a capacitor C3. The switching transistor Ts is controlled by an IC 6 via a driver stage 7 using a pulse-shaped voltage 11.

The switching of the switch mode power supply shown in FIG. 1 through the various operational phases is explained with reference to FIG. 2. At time 'to' the main voltage is applied to the terminals 1. The charging current iL flows via the charging resistor RL into the capacitor C2 so that the starting voltage Vcc rises linearly at capacitor C2. The IC 6 is so dimensioned that its current consumption iIC is initially zero. The total charging current iL flowing through resistor RL therefore, only charges capacitor C2 to the supply voltage Vcc. During this start-up phase from time 'to' to time t1, IC 6, passes no current. At t the current consumption iIC begins to flow through a threshold value circuit within IC 6 and a portion of current iL now flows into IC 6. This portion is, however, initially lower than current iL so that the voltage Vcc rises but less steeply. During this phase from t1 to t2 all components and conditions in IC 6 are set to defined values. However, IC 6 still remains inactive initially, i.e. performs no switching operation. When Vcc reaches the value Von, a reference voltage source, also designated as "bandgap", is activated in IC 6. Therefore, from time t2 onwards all functions of IC 6 are activated. As the initialization phase continues until time t3, the external power switch is actively switched off during t2 to t3. By activating the bandgap the current consumption iIC rises so that current iIC becomes greater than current iL and voltage Vcc drops because capacitor C2 discharges. The initialization phase lasts, therefore, over the time period t1 to t3 during which Vcc is greater than Vinit. The initialization phase ends at t3. Integrated IC 6 is now, at the defined state of all components, switched over to the pulsed operation and generates the pulses 11 which control the transistor Ts to be alternately conducting and blocked. The current iIC rises further and Vcc drops more rapidly. IC 6 would switch off again at Voff. The transformer Tr goes into pulsed operation in that the transistor Ts is triggered. Thereby, pulse voltage also ensues at the winding 8, this voltage is rectified via the rectifier 9 and becomes effective as a positive voltage at the terminal 10 of IC 6. This is at roughly time 14. The voltage at terminal 10 is now determined by the winding 8. This is capable of supplying the markedly increased current consumption of IC 6. Therefore, before Vcc can reach the value Voff, a steady state operating voltage Vn ensues at terminal 10 which guarantees normal operation of IC 6. The charging current iL now still contributes only minimally to the maintenance of the voltage at terminal 10. The current supply for IC 6, therefore, changes over from t5 onwards into a self supporting operation, so to speak, via the winding 8 and the rectifier 9.

FIG. 3 shows the corresponding relationships upon switching off. At time 'to' voltage Vcc has the normal nominal value Vn as shown in FIG. 2. At t1 an overload or another malfunction occurs. At first the circuit tries to correct the overload and keep the voltage +U1 constant by regulating the duration of current flow in transistor Ts and the frequency of the pulses 11. With an overload or other defect, the regulation is finally no longer capable of compensating because, for example, the maximum frequency, the maximum switch-on duration and hence the maximum final current end value in transistor Ts are reached. Then Vcc begins to drop. Upon reaching Voff at t2, IC 6 switches off and supplies no more pulses 11. The transistor Ts is then no longer triggered by pulses and component damage is avoided. The reference voltage source in IC 6 also designated as a bandgap, is also switched off. However, instead of this a defined active switching-off of the transistor Ts takes place during the period t2 to t3. This is important because otherwise, depending on the respective final condition, the transistor Ts may be in jeopardy. Such an active switching-off preferably consists of applying a blocking voltage to the base Ts which effects rapid evacuation of the charge carriers. During this period, the current consumption of the circuit IC is kept artificially higher than current iL and the supply voltage Vcc drops further. If the supply voltage drops below Vlow, then IC 6 is switched off completely, i.e. flipflops contained in the IC are erased. The current consumption iIC then becomes zero. As now the terminal 10 is no longer loaded by IC 6, the voltage Vcc increases again from t3 onwards. At time t4 voltage Vcc reaches the value Vinit. This again corresponds to the time t1 in FIG. 2. The switch mode power supply is then switched on again in the manner described. It is important here that a defined, adequate time exists between switching on and switching off so that the components are not overloaded in the case of defects by the repeated switching on and switching off the switch mode power supply.

FIG. 4 shows a detailed circuit in the IC 6 for realizing the processes according to FIG. 2. The operation of this circuit is described for the various individual operational phases shown in FIG. 2.

Start-up phase from 'to' to t1

During this time voltage Vcc is lower than the breakdown voltage Vz of the breakdown diode Z. As no current can flow through the resistors R1, R2, R3 the transistors T1, T2, T3, T4, T5 remain blocked. The current consumption iIC is then zero in the manner described. When Vcc reaches the value Vz, a small current initially flows through R1, R2. T1 remains blocked at first. However, T3 already became conductive before the flipflop formed by T1, T2 changes states. The conducting transistor T3 generates a base current in transistor T4 so that T4 becomes conductive. Thereby, a voltage is coupled from the junction point 'a' of R4 and R5 to the base of T5 so that T5 also becomes conductive. Thereby, the initialization current 'init' is generated which effects the initialization from t1 to t3 in FIG. 2. The bandgap 12, which serves as the reference voltage source, is initially switched off during the period t1 to t2 owing to the blocked transistor T2. During this period, the internal conditions are set in a defined way in the manner described. Due to the increasing voltage Vcc, the current through resistor R1 also increases. At t2 the flipflop T1/T2 switches on and T1 and T2 become conducting and a voltage Ug on resistor R7 switches on the bandgap 12, which generates the reference voltage Vref for the time periods t2 to t3 of the initialization phase and for the normal operation. Due to switching on the bandgap 12, current iIC becomes greater than current iL and voltage Vcc again drops. The current through transistor T3 is, therefore, reduced again. The bandgap 12 supplies a constant reference voltage Vref1 to the current mirror circuit 13 which causes a constant current in transistor T6. The current through R3 now becomes lower than the current supplied by the current mirror circuit 13. Therefore, T4 is no longer triggered so that the initialization current 'init' is again disconnected. This is at time t3 in FIG. 2 at the end of the initialization phase. During the period t2 to t3 the external power transistor Ts is actively turned off. Consequently, use of the circuit guarantees that the bandgap 12 supplying the reference voltages for the entire IC 6 is switched on before the initialization phase is finished at t3. The dotted line 14 represents the periphery of IC 6. The take-over of the current supply of IC 6 by the winding 8 and the rectifier 9 that occurs approximately during the period t4 to t5 according to FIG. 2 is performed outside of IC 6 in the manner described.

FIG. 5 shows, in principle, a switch mode power supply with a switching transistor Ts operating as power switch, the current test resistor 1, a so-called snubber network 2 which attenuates voltage peaks and which consists of a resistor 2a, a diode 2b, a capacitor 2c and a transformer Tr having a primary winding 3 and a secondary winding 4. The secondary winding 4 supplies the positive operating voltage +U1 via a rectifier 5 at a terminal 6. The voltage +U1 is compared with a reference voltage Vref3 in a compacitor stage 7. A variable regulating voltage 'Us' is obtained from this comparison. Voltage 'Us' actuates the switch S4 such that, during the idle phase of transformer Tr, when transistor Ts and diode 5 are non-conducting, a reverse charging current iR, opposite to the charging current i5, flows through diode 5 and into the transformer Tr. This reverse charging current iR is indicative of the level of U1. On the primary side, the corresponding induced voltage is selectively evaluated and used to regulate the switch-on duration and operating frequency of transistor Ts for the purpose of stabilizing voltage +U1. The triggering of the switching transistor Ts is explained for various operating phases. FIG. 6 shows the voltage VC at the collector of Ts with the direct voltage component of the level of UB. The voltage VT from an additional winding 14 of transformer Tr has the same waveform as voltage VC but has no direct current voltage component. The voltage VT is coupled via the evaluation stage 13 to the terminal 'a'. The stage 13 serves to evaluate voltage components Vpr and Vsec of voltage VT in a temporally successive fashion in the manner described in the following.

The voltage Vs at terminal 'a' is initially not present because the transformer Tr is not yet in switching operation and, consequently, the voltage VT is also not yet present. Owing to the reference voltage Vref1 at the "plus" input terminal of the operational amplifier OP1, a high current initially flows into the RC network 9 and the regulating voltage Vreg at terminal b starts to rise beginning from the base/emmiter voltage VBE of the transistor TI. This is represented by the start-up phase AP in FIG. 7. The transistor T1 has the effect that the Vreg cannot become higher than Vs plus the base/emitter voltage of T1. Thereby, it is prevented that, in the switching transistor Ts, a high collector current flows immediately after switching on. When voltage Vs reaches the voltage Vref1, then the operational amplifier OP1 takes over the function in such a way that, from now on, Vreg diminishes with increasing Vs in the regulating phase RP shown in FIG. 7. The regulating voltage Vreg is dependent upon the regulating information Vsec which is transmitted by means of the reverse charging current iR to the primary side. The regulating voltage Vreg which, consequently, contains the regulating information is coupled to the "minus" input of the operational amplifier OP2, at the "plus" input of which a bias voltage Vi is applied. Vi is dependent on the current 'is' through resistor 1.

Regulation of the switch-on duration of Ts

The stabilization of voltage U1 is carded out by regulation of the switch-on duration and the variation of the operating frequency of Ts. At the start of the current flowing phase, current 'is' and hence the voltage at the emitter of Ts is low. Therefore, Vi is also low. The reset input R of flipflop 10 is not triggered. The Q output remains high "1" and transistor Ts remains switched on. When the voltage Vi, which increases with current 'is' becomes larger than Vreg, then level "1" appears at the output of OP2 and flipflop 10 is reset at input R. Thereby, the Q-output goes low "0" and transistor Ts is switched off. The value of current 'is', therefore dependent upon Vreg and consequently upon Vsec and also upon the operating voltage U1. If, for example, through an increased load at terminal 6, +U1 attempts to drop, then the regulating information Vsec also drops and, as shown FIG. 7 point 'A', Vreg rises in the idle phase RP. This means that the maximum value of current 'is' also increases through the effect of op-amp OP2 and the energy transmitted via transformer Tr for the purpose of stablizing +U1 becomes larger.

Regulation of the switch-off duration of Ts for frequency regulation

At time T1 in FIG. 6 the switch S1 is closed, the voltage UC1 at the capacitor C1 is zero and the output of the operational amplifier OP3 goes to "0". The reset input R of flipflop 12 is set to level "1" during the time t1. The Q-output of flipflop 12 is therefore "0" so that the switch S3 is closed. Thereby, the regulating voltage Vreg is applied to the capacitor C2 and the "plus" input of the operational amplifier OP4. Initially voltage Vreg is smaller than voltage Vfmax at the "minus" input of OP4 and no signal appears at the output of OP4. At time t3 the switch S2 is closed for the period Δt2. Capacitor C1 is quickly charged by a correspondingly high current I1. Voltage UC1 at the "plus" input of OP3 reaches very quickly the value of Vref2 at the "minus" input so that the output of OP3 goes to "1". Thereby, flipflop 12 is set at input S and switch S3 is opened. The capacitor C2 still containing the regulating voltage Vreg is thereby separated from terminal b. The capacitor C2 is now charged again by a small current I3 in the order of magnitude of 1 ua. If now the voltage at C2 reaches the value Vfmax, then the output of OP4 goes to "1". Thereby, flipflop 10 is set at input S. Its Q output goes to "1", and Ts is again switched on. The switch-on time t4 is, therefore, dependent upon Vreg because the capacitor C2 is always charged by I3 from the value Vreg onwards.

If, for example, the voltage U1 attempts to drop at terminal 6 because of a high load, then the portion Vsec in VC, or respectively VT, becomes smaller and, as a result, Vreg in the idle phase RP becomes larger at terminal b according to FIG. 3. Therefore, Vreg at the capacitor C2 at time 13 becomes higher when S3 opens. With the following charging of C2 by current I3, therefore, the response of OP4 is achieved sooner. This means that Ts is switched on earlier, the switch-off duration is reduced and, consequently, the operating frequency is raised owing to the increased load at terminal 6 in a desired manner. The stablizing of +U1 by regulating the switch-on time of Ts in the manner already described remains unaltered.

Regulation of the switch-off duration of Ts at high power

In the high power range, a relatively high power dissipation would ensue in the resistor 2a of the snubber network if the switching transistor Ts, for example at time t5 (Vsec') were switched on. Therefore, at high power, by abandoning the described frequency regulation, the switching transistor Ts is basically switched on again at t4 at the end of the voltage portion Vsec required for regulation. This is achieved in the circuit accoeding to FIG. 5 in the following way: Vfmax is so adjusted that, at high power, Vreg is already larger than Vfmax when closing switch S3. The current I3 then no longer has the described effect in the regulation of the switch-off duration of Ts. Rather, Ts is switched on in a desired manner at t4 at the end of Vsec without regulating the switch-off duration.

In addition, the switch S6 has the following significance. The regulating voltage Vreg already appears at capacitor C2 through the closing of S3 during T1. Thereby, as such, the output of OP4 would already set flipflop 10 after t2 and switch on transistor Ts. However, this is not desired because Vsec must still be evaluated from t3 to t4. Therefore, switch S6 is first closed when the "1" signal of the operational amplifier OP3 occurring at time t3 appears delayed by Δt2 at time t4. The delay stage 15 is provided for actuating switch S6 at the correct time and said delay stage delays the switching signal from the set input S of flipflop 12 and the time Δt2. The setting of flipflop 10 and hence the switching-on of Ts is, therefore, carried out when, on the one hand, Vreg is applied via S3 to the "plus" input of OP4 and, additionally, switch S6 is closed by OP3.

We claim:

1. A switch mode power supply, comprising:
a source of a first supply voltage;
a capacitor;
a resistor coupled to said first source of supply voltage and to said capacitor for producing a current to charge said capacitor and to develop a second source of supply voltage in said capacitor;
a switching power transistor;
an integrated control circuit having a supply terminal coupled to said capacitor;
a source of reference voltage in said integrated circuit establishing a threshold;
said source of reference voltage inhibiting an input current from said second source of supply voltage during a start up interval in which said second supply voltage increases in magnitude until reaching said threshold;
said source of reference voltage enabling said input current from said second source of supply voltage during an initialization interval when said second supply voltage exceeds said threshold, said integrated circuit being initialized to a predetermined operating condition during said initialization interval, said second supply voltage decreasing in magnitude as said input current increases;
said control circuit generating a switching control signal for said switching power transistor after said initialization interval; and
a third source of supply voltage operable following said initialization interval and at least partly replacing said second source of supply voltage.

2. A power supply according to claim 1 wherein during a first portion of said initialization interval said predetermined state of each stage is established, said supply current is smaller than said charging current and said second supply voltage increases and during a second portion of said initialization interval said reference voltage source is turned on, said power transistor is actively turned off and said supply current becomes greater than said charging current, causing said second supply voltage to decrease in a ramping manner.

3. A power supply according to claim 1 wherein said control circuit comprises a zener diode responsive to said second supply voltage for establishing said threshold level.

4. A power supply according to claim 1 further comprising, means for increasing a current drain from said capacitor when, as a result of a fault condition, said control circuit ceases operating.

5. A power supply according to claim 1 further comprising, means for generating a blocking voltage that actively turns off said power transistor in case of a malfunction.

6. A switch mode power supply, comprising:
an isolating transformer having a primary side and a secondary side;
a switching transistor coupled to said transformer for energizing a load;
means coupled to a secondary side winding of said transformer for generating a reverse charging current transformer coupled to a primary side winding of said transformer during an idle phase of said transformer to develop a signal containing regulation information;
a regulating circuit responsive to said transformer coupled signal and coupled to said switching transistor for producing a switching control signal for said switching transistor such that, when power delivered to said load is low, said switching transistor has a switching frequency which varies in proportion to said power, and when said power delivered to said load is high, said switching transistor is switched off during said idle phase, immediately after said signal containing said regulation information is applied to said regulating circuit; and
a snubber network coupled to said transformer for reducing peak voltages.

7. A power supply according to claim 6 wherein said regulating circuit comprises a first comparator responsive to a current that flows in said transistor and to a regulating voltage that is derived from said transformer coupled signal for generating a switching signal that controls an instant when said transistor is turned off.

8. A power supply according to claim 7 further comprising, a second comparator responsive to a constant reference voltage for generating a switching signal that controls a turning on instant of said transistor.

9. A power supply according to claim 6 further comprising, means coupled to a winding of said transformer for applying to said regulating circuit first and second voltage components of a voltage that is developed in said transformer in a time multiplexed successive manner.

* * * * *